United States Patent
Jakubowski et al.

(10) Patent No.: US 11,585,096 B2
(45) Date of Patent: Feb. 21, 2023

(54) ULTRA-LIGHT FREESTANDING PET RAMP

(71) Applicant: Vermont Juvenile Furniture Mfg., Inc., West Rutland, VT (US)

(72) Inventors: Chris Jakubowski, Rutland, VT (US); Todd Jakubowski, Rutland, VT (US); Kristen Jakubowski, Rutland, VT (US)

(73) Assignee: VERMONT JUVENILE FURNITURE MFG., INC., West Rutland, VT (US)

( * ) Notice: Subject to any disclaimer, the term of this patent is extended or adjusted under 35 U.S.C. 154(b) by 644 days.

(21) Appl. No.: 16/690,472

(22) Filed: Nov. 21, 2019

(65) Prior Publication Data

US 2020/0308842 A1    Oct. 1, 2020

Related U.S. Application Data

(60) Provisional application No. 62/824,026, filed on Mar. 26, 2019.

(51) Int. Cl.
| | | |
|---|---|---|
| *E04F 11/00* | (2006.01) | |
| *A01K 29/00* | (2006.01) | |
| *A01K 15/02* | (2006.01) | |

(52) U.S. Cl.
CPC .......... *E04F 11/002* (2013.01); *A01K 15/027* (2013.01); *A01K 29/00* (2013.01); *E04F 2011/005* (2013.01)

(58) Field of Classification Search
CPC .. E04F 11/002; E04F 2011/005; A01K 1/035; A01K 29/00
USPC .................................................. 14/69.5–72.5
See application file for complete search history.

(56) References Cited

U.S. PATENT DOCUMENTS

| | | | | | |
|---|---|---|---|---|---|
| 3,159,141 | A | * | 12/1964 | Paterek | A01K 15/024 482/142 |
| 5,347,672 | A | * | 9/1994 | Everard | B60P 1/43 160/133 |
| 5,870,788 | A | * | 2/1999 | Witkin | A01K 1/035 414/921 |
| 6,119,634 | A | * | 9/2000 | Myrick | A01K 13/00 119/847 |
| 6,389,629 | B1 | * | 5/2002 | Schouest | B60P 1/43 16/269 |
| 6,484,343 | B1 | | 11/2002 | Phillips | |
| 6,898,815 | B2 | * | 5/2005 | Young | B65G 69/30 14/72.5 |

(Continued)

FOREIGN PATENT DOCUMENTS

| | | |
|---|---|---|
| GB | 2320408 | 6/1998 |
| WO | 2017009818 | 1/2017 |

OTHER PUBLICATIONS

Pet Gear Fee-Standing Extra Wide Pet Ramp, product information and instruction manual, 6 pages, https://www.petgearinc.com/product_info.asp?id=503, Aug. 7, 2018.

*Primary Examiner* — Raymond W Addie
(74) *Attorney, Agent, or Firm* — Volpe Koenig

(57) ABSTRACT

A pet ramp is provided having two panels in a collapsible arrangement, with a first panel having legs and a second panel able to be cantilevered from the first panel. The second panel extends beyond the legs and is pivotable to rest on any available surface. A stop is provided between the first and second panels to hold a cantilevered deployed position of the second panel.

11 Claims, 7 Drawing Sheets

(56) References Cited

U.S. PATENT DOCUMENTS

| | | |
|---|---|---|
| 6,968,810 B2 | 11/2005 | Bishop |
| 7,004,308 B2 | 2/2006 | Parks et al. |
| 7,185,381 B1 * | 3/2007 | Heartsill ................ A01K 1/035 |
| | | 14/71.1 |
| 7,222,838 B1 | 5/2007 | Ji |
| 7,225,492 B2 | 6/2007 | Pratt |
| 7,621,236 B2 | 11/2009 | Steffey et al. |
| 8,469,831 B2 | 6/2013 | Jobe |
| D736,485 S | 8/2015 | Jakubwoski et al. |
| 9,440,808 B2 | 9/2016 | Giemza et al. |
| 9,694,997 B2 | 7/2017 | Lopez |
| 9,776,547 B2 | 10/2017 | Lin |
| 9,857,405 B2 * | 1/2018 | Nastase .............. G01R 27/2605 |
| 2003/0140433 A1 | 7/2003 | Rieber |
| 2007/0074675 A1 | 4/2007 | Tu |
| 2012/0174325 A1 * | 7/2012 | Woo ...................... E04F 11/002 |
| | | 14/69.5 |
| 2017/0022017 A1 | 1/2017 | Lopez |
| 2017/0347622 A1 * | 12/2017 | Macneil .................. B60R 3/007 |
| 2019/0150400 A1 * | 5/2019 | Kumar .................. B65G 69/30 |
| 2020/0037582 A1 * | 2/2020 | Caterson ................ A01K 29/00 |
| 2022/0251848 A1 * | 8/2022 | Sweetnam ............ E04F 11/062 |

\* cited by examiner

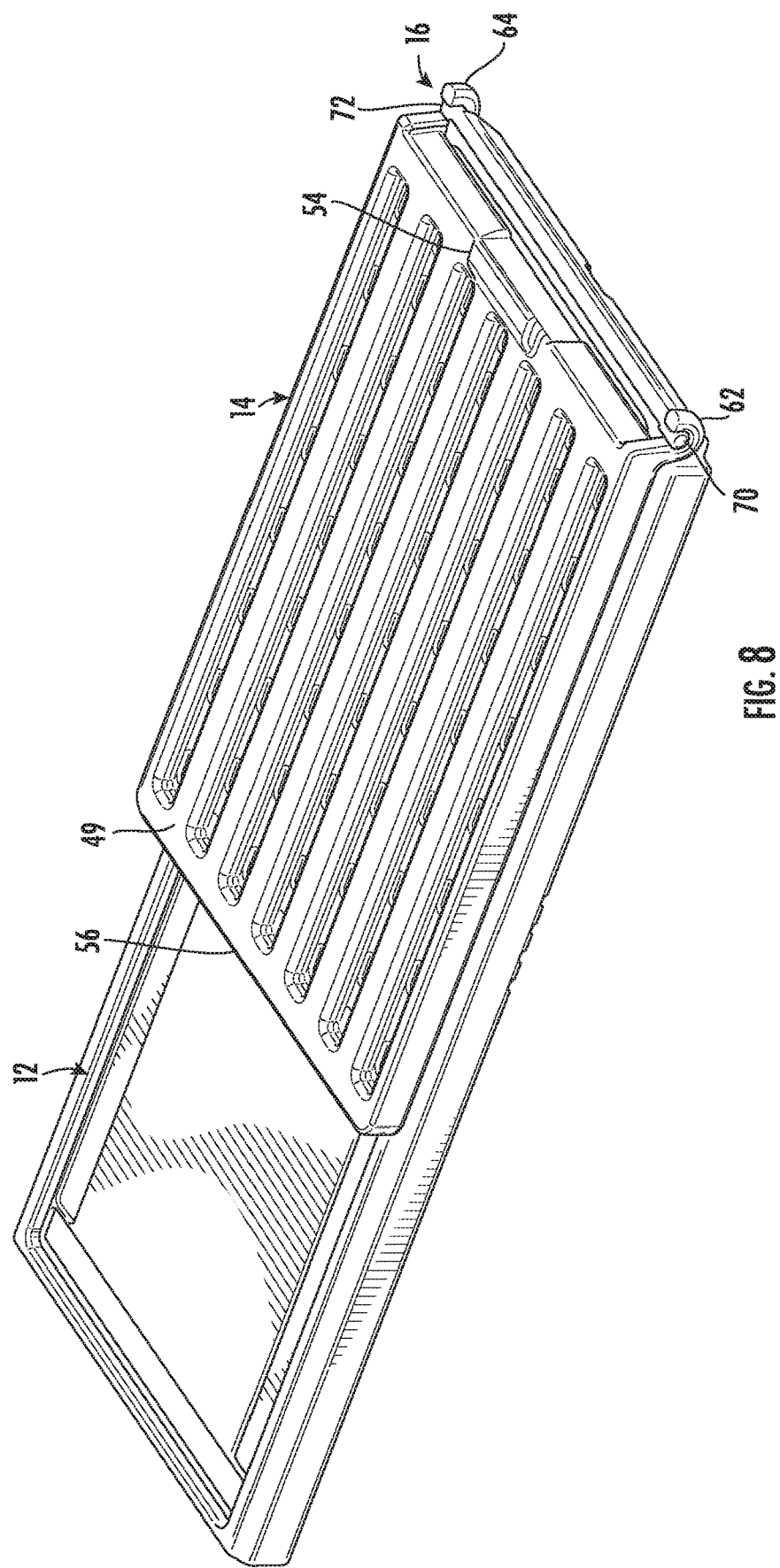

US 11,585,096 B2

ULTRA-LIGHT FREESTANDING PET RAMP

INCORPORATION BY REFERENCE

The following documents are incorporated herein by reference as if fully set forth: U.S. Provisional Patent Application No. 62/824,026, filed Mar. 26, 2019.

FIELD OF THE INVENTION

This invention relates to the field of pet accessories, and more particularly, to a pet ramp having first and second panels, with a hinge assembly between the panels, allowing for various uses or compact collapse.

BACKGROUND

Pet ramps and tables are used for a variety of purposes, including transfer in/out of a vehicle, agility training, dog shows, and the like. Due to the variety and nature of the uses, pet ramps may need to be transported by a user. These tables and ramps can be cumbersome and heavy.

Some pet ramps may only function as an accessory lean-to structure, for example, a ramp that rests on a vehicle's tailgate or floor to allow a pet's safe ingress/egress. However, such a ramp may have limited reach or require a steep angle to reach some heights.

Thus, there is a need for a pet ramp that is easy to use and transport with improved utility. In particular, there is a need for a pet ramp that is lightweight and collapsible but also durable and readily adaptable to a variety of circumstances.

SUMMARY

The present invention provides for a pet ramp having a first panel, a second panel, a hinge assembly, and a stop. The first panel includes legs. The hinge assembly is for connecting the first panel to the second panel and for moving the pet ramp between a collapsed position and a deployed position. The stop is for holding the pet ramp in the deployed position. In the deployed position, the second panel is cantilevered at an obtuse angle from the first panel.

In one embodiment, in the deployed position a free end of the second panel is above a ground contact plane.

In one embodiment, the hinge assembly includes a hook on one of the first and second panels and a peg on the other of the first and second panels.

In one aspect, the hook has resiliency configured for selective removal of the hook from the peg.

In another aspect, the hook comprises a pair of hooks integrally formed with the second panel and wherein the stop is integrally formed with the second panel.

In yet another aspect, the pair of hooks extends above the second panel and the stop extends below the second panel.

In still another aspect, the stop is positioned between the pair of hooks.

In one embodiment, the stop is configured to hold the first panel and the second panel at oblique angles from horizontal in the deployed position.

In another embodiment, in the deployed position, the first panel and the second panel are at oblique angles from the legs.

In another embodiment, the stop is integrally formed with one of the first panel and the second panel.

In another embodiment, the stop is a flange extending from one of the first panel and the second panel, the flange having a flat surface for supporting the other of the first panel and the second panel.

In another aspect, the first panel defines a height and the legs are configured to fold and store within the height of the first panel.

In another aspect, the legs are pivotally attached to the first panel to be moveable from a collapsed position to a deployed position.

In another aspect, the legs have different heights in the deployed position.

BRIEF DESCRIPTION OF THE DRAWINGS

FIG. 8 is a top perspective view of the pet ramp of FIG. 7.

DETAILED DESCRIPTION

Figure 1:
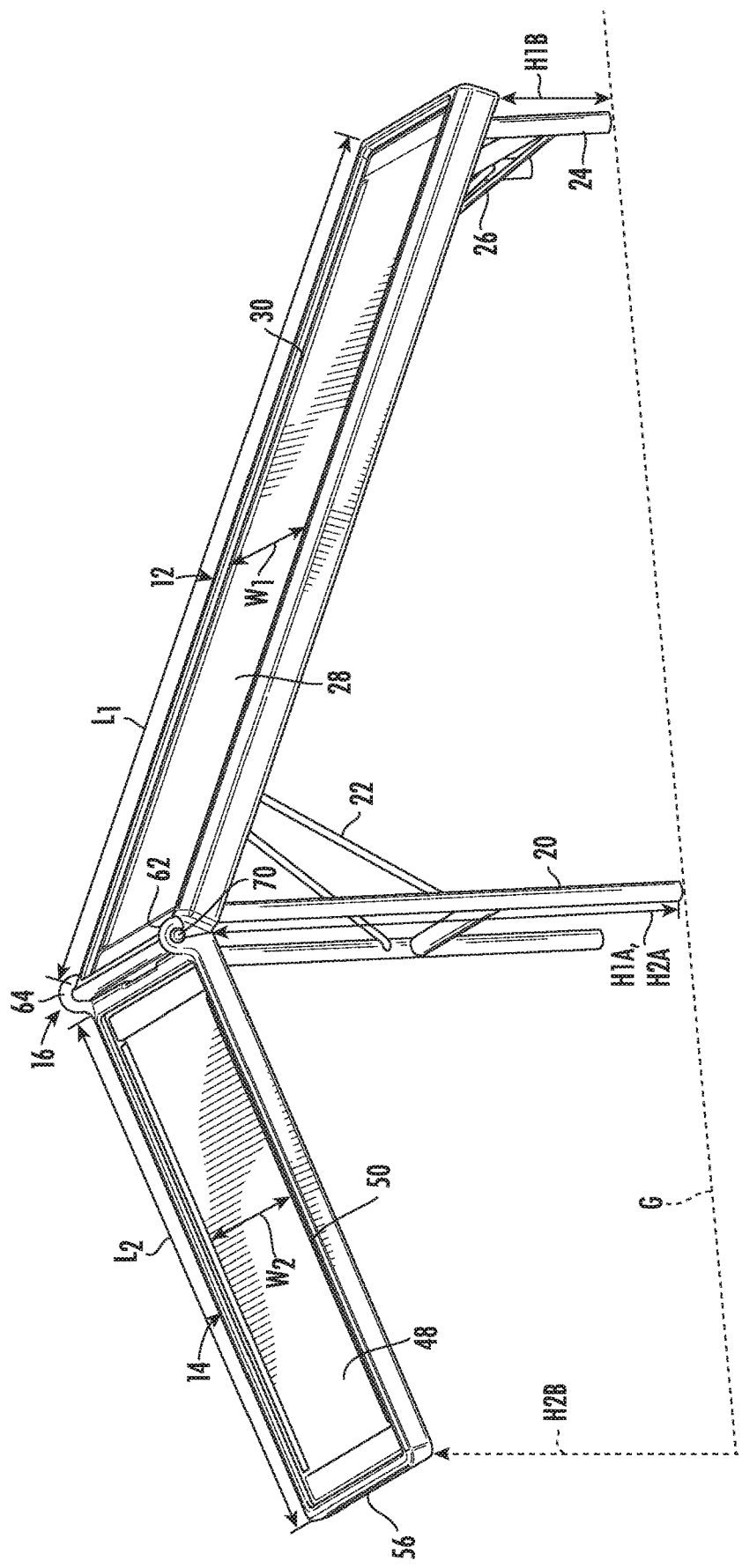
FIG. 1 is a side perspective view of an exemplary pet ramp according to an embodiment of the present application.

Certain terminology is used in the following description for convenience only and is not considered limiting. Words such as "front", "back", "top" and "bottom" designate directions in the drawings to which reference is made. This terminology includes the words specifically noted above, derivatives thereof and similar words. It is understood that this invention is not limited only to the particular embodiments, methodology, materials, and modifications described herein, and as such may vary. It is also understood that the terminology used herein is not intended to limit the scope of the present invention, which is limited only by the appended claims.

Figure 2:
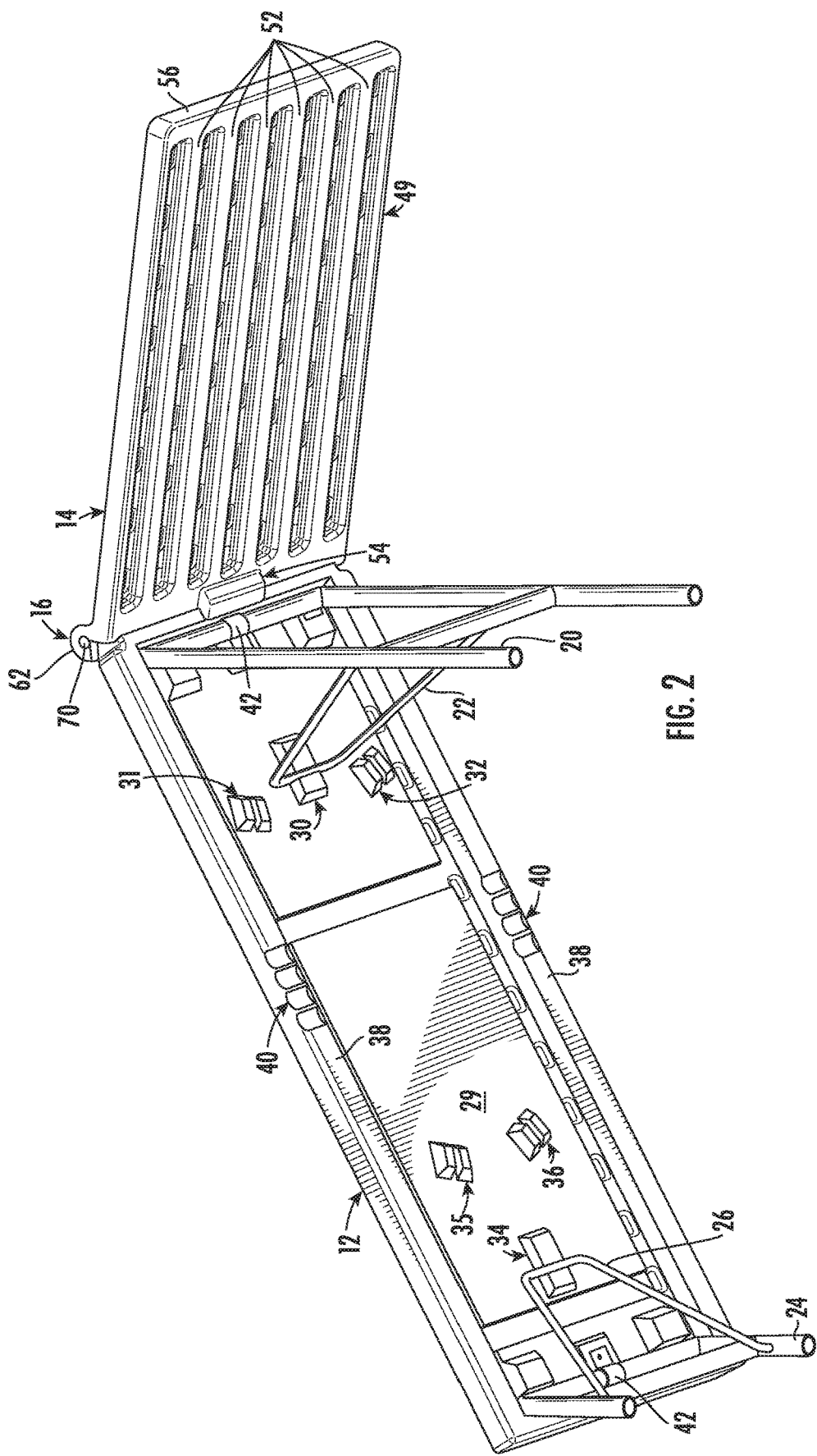
FIG. 2 is a bottom perspective view of the pet ramp of FIG. 1.
Figure 3:
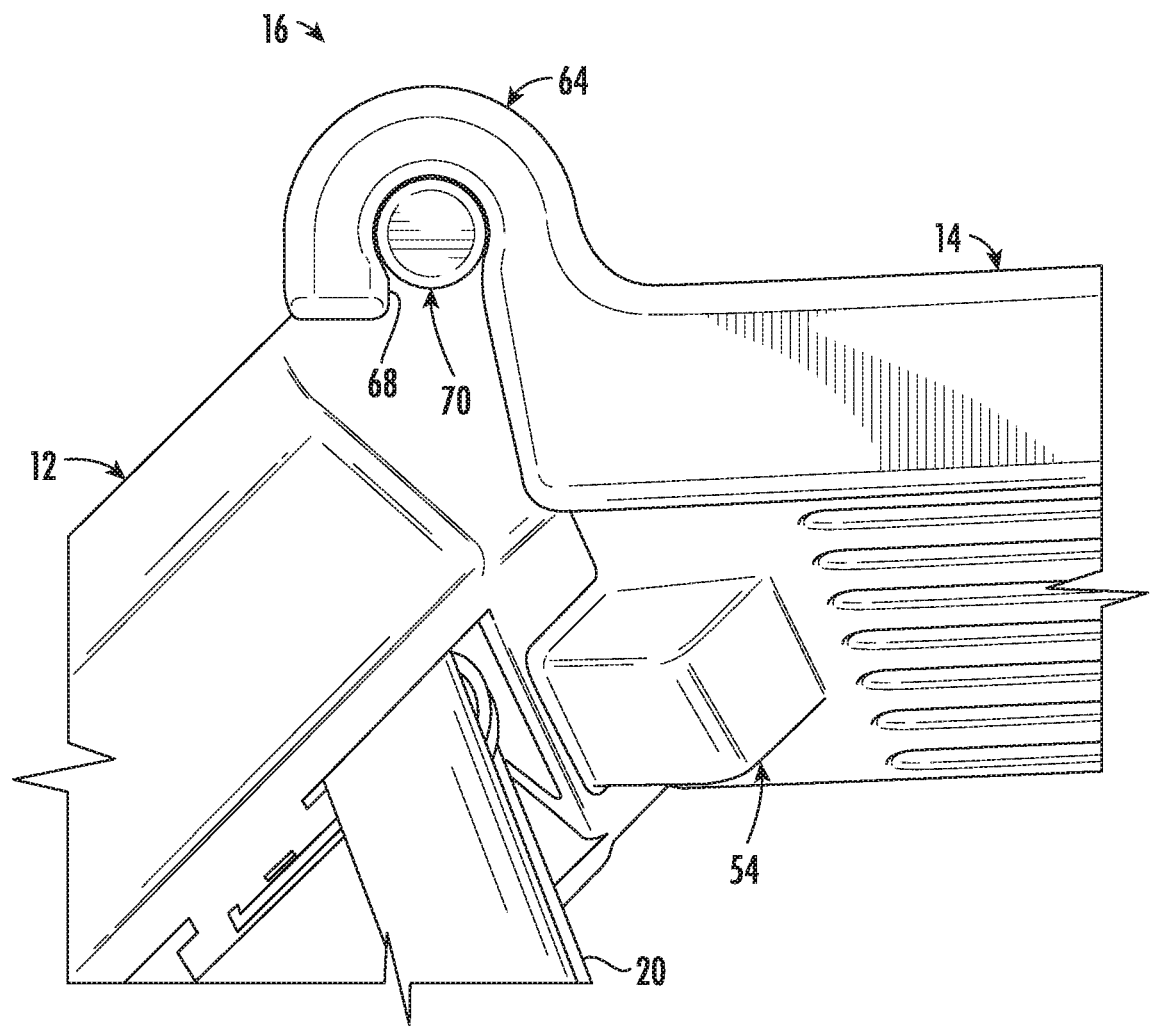
FIG. 3 is a partial side perspective view of a hinge assembly of the exemplary pet ramp of FIG. 1.

FIGS. 1-2 show an exemplary embodiment of a pet ramp 10, including a first panel 12 (also referred to as a long panel) and a second panel 14 (or short panel) with a hinge assembly 16 therebetween. In the illustrated embodiment, the first panel 12 is rectangular with a length L1 and width W1 and the second panel 14 is rectangular with a length L2 and width W2. The length L1 may be greater than the length L2, for example L1 may be about 50% longer than L2. The widths W1 and W2 may be substantially equal. The first panel 12 includes first legs 20 with an angled brace 22 and second legs 24 with an angled brace 26. The first legs 20 may be longer than the second legs 24 so that the first panel 12 is angled when standing on a flat surface. In the illustrated embodiment, the height H1A of the upper end of the first panel 12 proximate the first legs 20 is about three times the height H1B of the first panel 12 proximate the second legs 24. A proximal end of the second panel 14 is at a height H2A that is equal to H1A.

The first panel 12 and the second panel 14 have respective top surfaces 28, 48, one or both of which may have respective recessed areas 30, 50. These optional recessed areas 30, 50 are provided for receiving an insert (not shown) formed from foam or a carpet-like material to improve comfort and traction. The recessed areas 30, 50 may be eliminated, particularly if the top surfaces 28, 48 themselves are formed from or coated with a suitable material for comfort/traction.

Figure 7:
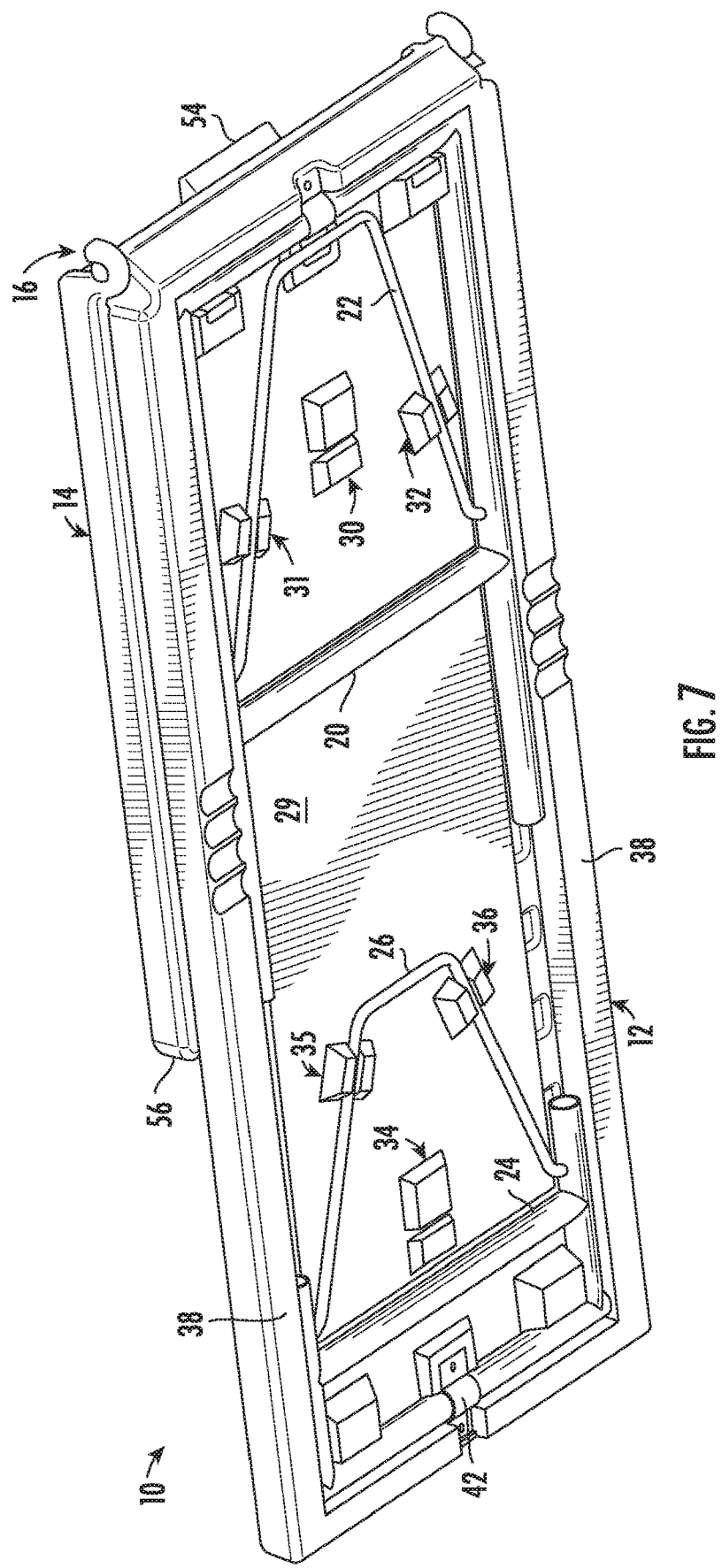
FIG. 7 is a bottom perspective view of the pet ramp of FIG. 1 in a collapsed position.

As shown in FIGS. 2 and 7, the first panel 12 has a bottom surface 29 opposite the top surface 28. A first catch 30 is provided to support the brace 22 of the first leg 20 in a deployed position. Second and third catches 31, 32 are provided to support the brace 22 in a collapsed position, as shown in FIG. 7. Similarly, a fourth catch 34 is provided to support the brace 26 of the second leg 24 in a deployed position. Fifth and sixth catches 35, 36 are provided to support the brace 26 in the collapsed position. The various catches 30, 31, 32, 34, 35, 36 may positively hold the respective braces 22, 26 for example by a friction fit. In the illustrated embodiment shown in FIGS. 2 and 4, the catches 30, 31, 32, 34, 35, 36 may be formed of two protrusions with a gap therebetween for receiving a portion of the respective first or second leg 20, 24. The illustrated catches are integrally formed from the same material and in the same process as the first panel 12.

The bottom surface 29 of the first panel 12 is recessed from sidewalls 38. In this manner, when the first and second legs 20, 24 are in the collapsed position, they fit within the height of the sidewalls 38.

The first panel 12 may also include handgrips 40 to aid ergonomics in carrying and using the pet ramp 10. As illustrated, the handgrips 40 are integrally formed in the sidewalls 38 along a midsection of the long sides of the first panel 12. One skilled in the art would appreciate that various locations and structures may be incorporated into the first panel 12 and/or the second panel 14 to similarly improve ergonomics.

Figure 4:
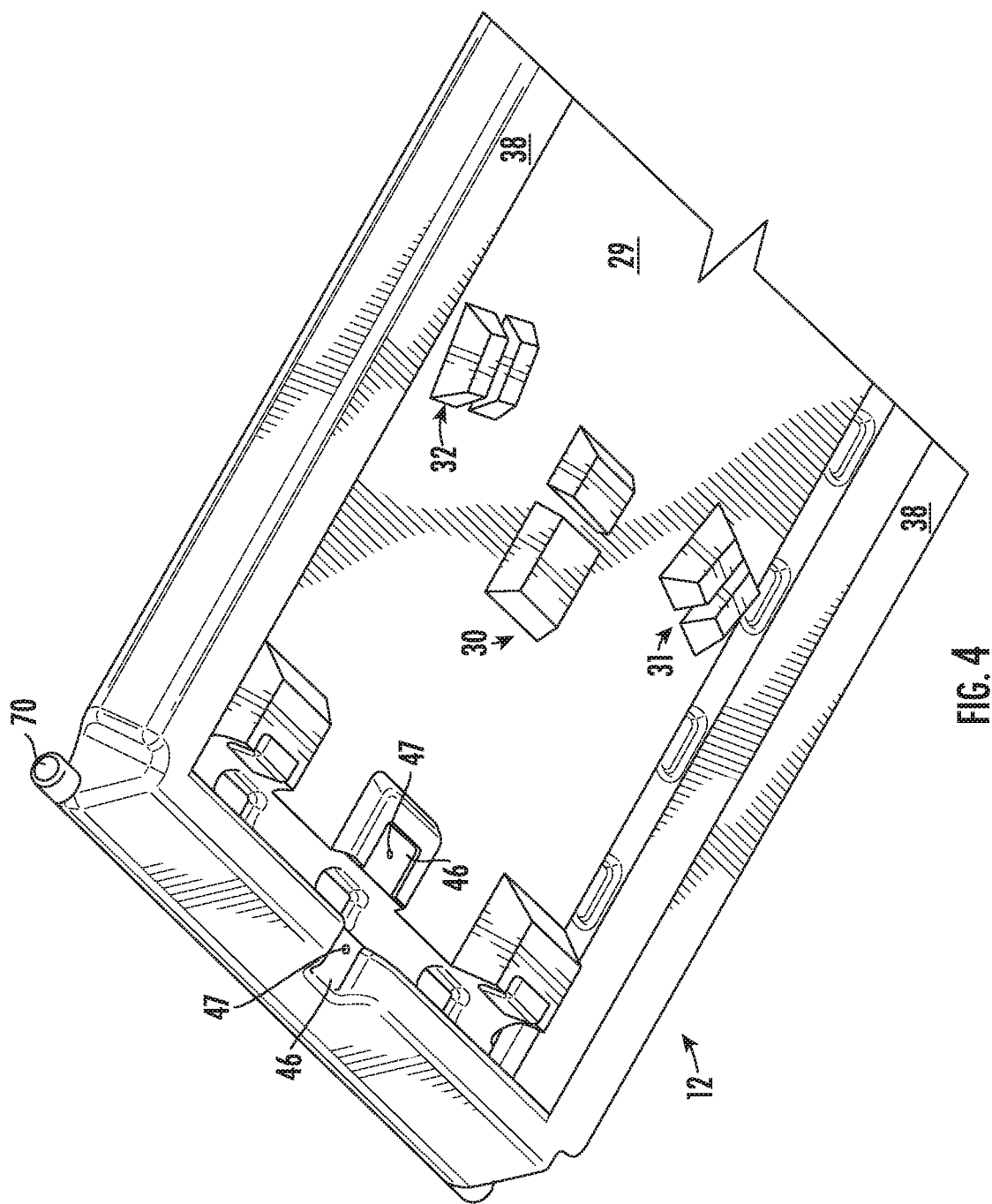
FIG. 4 is a partial bottom perspective view of a first panel of the pet ramp of FIG. 1 with certain parts removed.
Figure 6:
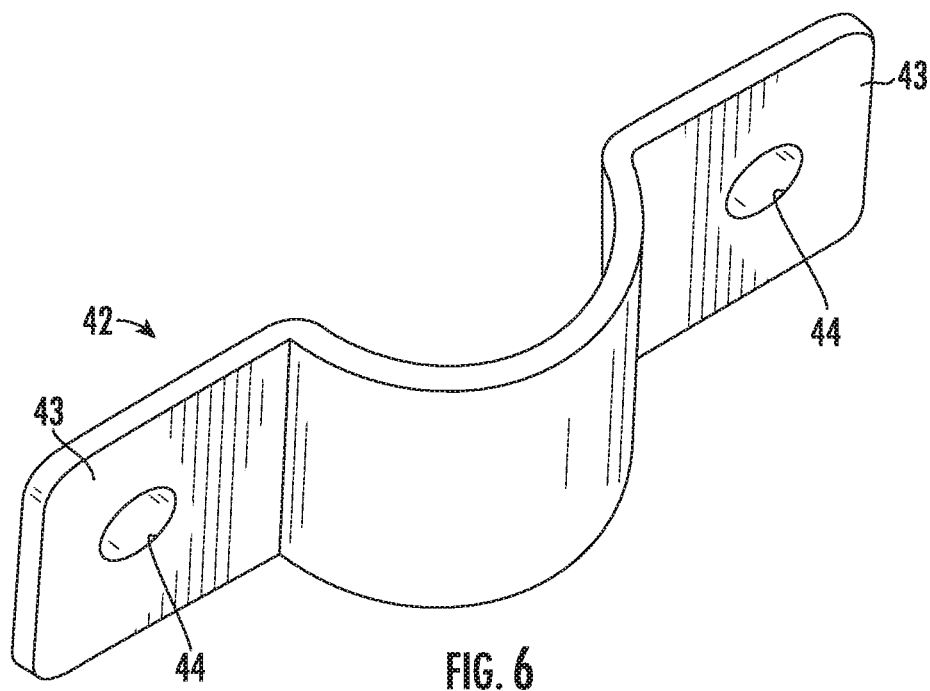
FIG. 6 is a perspective view of a bracket of the pet ramp of FIG. 1.

As shown in FIGS. 2 and 6, a bracket 42 is provided at a proximal end of each of the legs 20, 24 for attaching the legs to the first panel 12 and allowing pivoting motion between the deployed (FIGS. 1-2) and collapsed (FIGS. 7-8) positions. The bracket may be semicircular to conform to a portion of the first leg 20 and may have ears 43 with bolt holes 44 for mounting to the first panel 12 via bolts, screws, fasteners or the like. As shown in FIG. 4, the first panel 12 has corresponding flat areas 46 for receiving the ears 43 and bolt holes for also receiving the bolts, screws, fasteners, or the like.

The second panel 14 is shown in detail in FIGS. 1-3 and 5. As noted above, the second panel 14 includes a top surface 48 with a recessed area 50. The second panel also includes a bottom surface 49 (FIG. 2) that may have a plurality of ribs 52 along its length. In the freestanding deployed position shown in FIG. 1, the free end 56 of the second panel 14 is cantilevered above a ground contact plane G.

Figure 5:
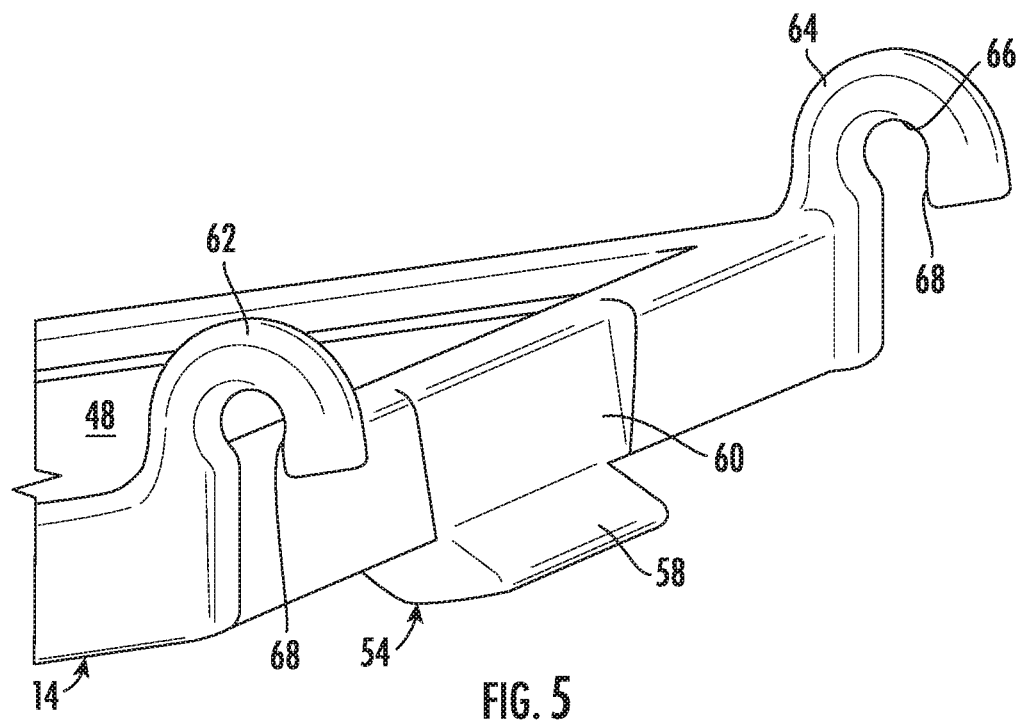
FIG. 5 is a partial perspective view of a second panel of the pet ramp of FIG. 1.

A stop 54 is provided at a proximal end of the second panel 14, opposite the free end 56. As shown in FIG. 5, the stop 54 extends below the second panel 14 and includes a face 58 for receiving a portion of the first panel 12 in the deployed position. The face 58 dictates the angle for the second panel 14 in the fully-deployed position of FIGS. 1-2. A recessed area 60 is formed in the proximal end of the second panel 14 and proximate to the stop 54, to allow pivoting movement of the first and second panels 12, 14.

As best shown in FIGS. 2-5, the hinge assembly 16 includes hooks 62, 64 on the second panel 14 that receive respective pegs 70, 72 on the first panel. Each hook 62, 64 defines a passage 66 and may have a foot 68 extending inwardly toward the second panel 14. The passage may be generally circular to conform to the round pegs 70, 72. The foot 68, along with the passage 66 extending around more than 180°, provides a positive hold to retain the pegs 70, 72. At the same time, the material of the hooks 62, 64 may have a degree of resiliency to allow the hooks to temporarily be forced open for insertion/removal of the pegs 70, 72.

Accordingly, the second panel 14 may be completely removed from the first panel 12 by removing the pegs 70, 72 from the hooks 62, 64. In this sense, the pet ramp 10 is capable of knockdown or disassembly as an alternative to pivoting to the collapsed position of FIGS. 7-8. Moreover, either the first panel 12 or the second panel 14 may be used individually. For example, the first panel 12 could function as a freestanding inclined ramp/table or the second panel 14 could function as a simple ramp supported by the ground and another surface such as a vehicle bumper.

The hooks 62, 64 and the stop 54 may be integrally formed with the second panel 14; that is, formed from the same material at the same time by the same process. Likewise, various component parts of the first panel 12 and second panel 14 may be integrally formed, to simplify manufacturing and reduce material costs. For example, the first panel 12 may be integrally formed with the catches 30-32 and 34-36, the sidewalls 38, and/or with the pegs 70, 72. Likewise the second panel may be integrally formed with the ribs 52, the stop 54, and/or with the hooks 62, 64.

In operation, the free end 56 of the second panel 14 may rest on another object to be held above the illustrated deployed position (i.e., without the stop 54 engaging the first panel 12). For example, the second panel 14 may extend to the seat of a vehicle, providing a greater lateral reach that the first panel 12 alone (which would be inhibited by the legs 20). In a similar manner, the free end 56 of the second panel 14 may extend above the height H2B of the deployed position shown in FIG. 1. The second panel 14 may even extend above the height H1A proximate the legs 20, for example to allow access to a truck bed or other high surface. The hinge assembly 16 allows pivoting from the deployed position of FIG. 1 to any intermediate position or to the collapsed position of FIGS. 7 and 8.

The arrangement of the present invention, having the second panel 14 pivotable and cantilevered from the first panel 12, provides advantages over the prior art. The free end 56 of the second panel 14 can rest on objects (vehicles, furniture, or the like) of a wide range of heights from H2B to heights greater than H1A/H2A.

The first and second panels 12, 14 may be formed of any suitable material. To reduce weight, the first and second panels 12, 14 may be formed of a hollow plastic material formed by a blow molding process. Alternatively, the first and second panels 12, 14 may be formed of materials such as wood or acrylonitrile butadiene styrene (ABS) plastic.

As a further alternative, the first panel 12 may include a brace (not shown) that extends outward from the legs 20 to the second panel 14 to provide additional support for the second panel, similar to the manner that the braces 22 and 26 extend inward from the legs 20, 24 to the first panel 12.

One skilled in the art would appreciate that various styles and types of known legs may be substituted for the legs 20 and 24, preferably still configured for collapse within the sidewalls 38 of the first panel 12 (in other words, collapse within the height of the first panel). The first and second legs 20, 24 are illustrated as generally U-shaped with crossbars at their distal ends, but various shapes and arrangements are contemplated. For example, one or both of the legs 20, 24 may be replaced with a panel. The legs 20 and 24 may be completely removable, instead of pivotable, and then preferably may be stored within the sidewalls 38 of the first panel 12, for example via a snap fit.

It is understood that this invention is not limited to the particular embodiments disclosed, but is intended to cover all modifications and combinations which are within the spirit and scope of the invention as described herein and/or defined by the appended claims, the above description, and/or shown in the attached drawings. One skilled in the art will appreciate that various changes are possible. For example, the free end 56 of the second panel 14 may include retention means (not shown) for temporary attachment to another surface or object. The angle of the face 58 relative to the second panel 14 (and therefore, the angle of the second panel 14 in the fully deployed position) may be varied according to particular design needs. The stop 54 may be incorporated into the first panel 12 instead of the second panel.

What is claimed is:

1. A pet ramp, comprising:
   a first panel having legs;
   a second panel; and
   a hinge assembly for connecting the first panel to the second panel and for moving the pet ramp between a collapsed position and a deployed position; and
   a stop for holding the pet ramp in the deployed position,
   wherein in the deployed position, the second panel is cantilevered at an obtuse angle from the first panel, the hinge comprises a pair of hooks integrally formed with the second panel and a peg on the first panel, the stop is integrally formed with the second panel, and the stop is positioned between the pair of hooks.

2. The pet ramp of claim 1, wherein in the deployed position a free end of the second panel is above a ground contact plane.

3. The pet ramp of claim 1, wherein the pair of hooks have resiliency configured for selective removal of the hooks from the peg.

4. The pet ramp of claim 1, wherein the pair of hooks extends above the second panel and the stop extends below the second panel.

5. The pet ramp of claim 1, wherein the stop is configured to hold the first panel and the second panel at oblique angles from horizontal in the deployed position.

6. The pet ramp of claim 1, wherein in the deployed position, the first panel and the second panel are at oblique angles from the legs.

7. The pet ramp of claim 1, wherein the stop is integrally formed with one of the first panel and the second panel.

8. The pet ramp of claim 1, wherein the stop is a flange extending from one of the first panel and the second panel, the flange having a flat surface for supporting the other of the first panel and the second panel.

9. The pet ramp of claim 1, wherein the first panel defines a height and the legs are configured to fold and store within the height of the first panel.

10. The pet ramp of claim 1, wherein the legs are pivotally attached to the first panel to be moveable from a collapsed position to a deployed position.

11. The pet ramp of claim 1, wherein the legs have different heights in the deployed position.

\* \* \* \* \*

UNITED STATES PATENT AND TRADEMARK OFFICE
CERTIFICATE OF CORRECTION

PATENT NO. : 11,585,096 B2
APPLICATION NO. : 16/690472
DATED : February 21, 2023
INVENTOR(S) : Chris Jakubowski et al.

It is certified that error appears in the above-identified patent and that said Letters Patent is hereby corrected as shown below:

In the Specification

IN THE DETAILED DESCRIPTION
In Column 4, Line 27, after the word "reach", delete "that" and insert therefor --than--.

Signed and Sealed this
Fifteenth Day of August, 2023

Katherine Kelly Vidal
*Director of the United States Patent and Trademark Office*